United States Patent
Randall et al.

(10) Patent No.: US 6,813,378 B2
(45) Date of Patent: Nov. 2, 2004

(54) METHOD FOR DESIGNING MATRIX PAINTINGS AND DETERMINATION OF PAINT DISTRIBUTION

(75) Inventors: John N. Randall, 2906 Ambleside La., Richardson, TX (US) 75082; Christian H. Seidler, Marshall, TX (US)

(73) Assignee: John N. Randall, Richardson, TX (US)

( * ) Notice: Subject to any disclaimer, the term of this patent is extended or adjusted under 35 U.S.C. 154(b) by 612 days.

(21) Appl. No.: 09/838,588

(22) Filed: Apr. 18, 2001

(65) Prior Publication Data

US 2002/0005868 A1 Jan. 17, 2002

Related U.S. Application Data

(60) Provisional application No. 60/198,592, filed on Apr. 19, 2000.

(51) Int. Cl.[7] .............................. G06K 9/36; G09G 5/04
(52) U.S. Cl. ........................ 382/162; 382/274; 345/593
(58) Field of Search ................................ 382/162, 274; 348/34; 345/593, 603, 605; 358/518, 520

(56) References Cited

U.S. PATENT DOCUMENTS

| | | | | |
|---|---|---|---|---|
| 5,038,223 A | * | 8/1991 | Yamada | 358/445 |
| 5,093,717 A | * | 3/1992 | Sandrew | 348/34 |
| 5,164,825 A | * | 11/1992 | Kobayashi et al. | 348/441 |
| 5,424,822 A | * | 6/1995 | Daniels | 355/402 |
| 5,534,915 A | * | 7/1996 | Sandrew | 348/29 |
| 5,562,451 A | * | 10/1996 | Wilcox et al. | 434/84 |
| 5,844,565 A | * | 12/1998 | Mizutani et al. | 345/581 |
| 5,913,992 A | * | 6/1999 | Gerber | 156/64 |
| 6,021,417 A | * | 2/2000 | Massarksy | 715/502 |

OTHER PUBLICATIONS

Paul Haeberli, Paint by Numbers: Abstract Image Representation, Proceedings of the 17th Annual Conference on Computer Graphics and Interactive Techniques, Aug. 1990, vol. 24, No. 4, pp. 207–214.*

Kaplan et al, Interactive Artistic Rendering, Proceedings of the first international symposium on Non–photorealistic animation and rendering, Jun. 2000, pp. 67–74.*

English Abstract of JP 01022370 A, Jan. 25, 1989 (Hideshima).*

* cited by examiner

*Primary Examiner*—Bhavesh M. Mehta
*Assistant Examiner*—Christpher Sukhaphadhana
(74) *Attorney, Agent, or Firm*—Groover & Holmes

(57) ABSTRACT

A design tool which accepts the input of a grayscale underpainting and a number of artistic selections, such as primary colors, levels of intensity for each color, and lines of color drawn on a copy of the grayscale underpainting and forms a data base which can be used by a painting tool to create a Matrix painting.

4 Claims, 5 Drawing Sheets

(3 of 5 Drawing Sheet(s) Filed in Color)

METHOD FOR DESIGNING MATRIX PAINTINGS AND DETERMINATION OF PAINT DISTRIBUTION

CROSS-REFERENCE TO OTHER APPLICATION

This application claims priority from No. 60/198,592, filed Apr. 19, 2000, which is hereby incorporated by reference.

BACKGROUND AND SUMMARY OF THE INVENTION

The present invention relates to the automation of painting a textured painting and more specifically to the automation of painting Matrix paintings.

Background: Matrix Paintings

Christian Seidler, an artist living in Jefferson, Tex., has developed a painting technique referred to as Matricism. While this document does not need to provide a complete description of the technique, certain aspects are essential to understanding the invention described herein. We will refer to paintings in the Matricism style as Matrix paintings.

A Matrix painting starts with a grayscale underpainting, such as the one shown in FIG. 1. The artist then defines geometric shapes that overlay the underpainting. These geometric shapes are often lines but are not restricted to lines. For the purposes of this discussion we will initially restrict the discussion to lines, and will later generalize to arbitrary geometric shapes. FIG. 2 is an example of an underpainting in which the lines have been drawn over the underpainting. The lines are shown in color to clearly distinguish the lines from the grayscale underpainting.

In a Matrix painting the artist selects a number of principal colors to work with. This could be a single principal color or as many as the artist desires. In our example, we will assume that the artist has selected 3 principal colors, red, blue, and yellow. While we have selected for this example simple colors, there is no restriction on what the artist selects as principal colors; they could be aqua-marine, burnt-orange, and raspberry rather than our simpler selection of red, blue, and yellow. Each of these principal colors will be associated with specific lines that the artist has drawn.

Let us first deal with the principal color red and its associated lines. Paints are prepared in a range of intensities of red. The artist decides on the number of intensities to be used for the painting, for the purposes of this example we will assume that 15 different intensities have been selected. Let us also assign intensity number 8 to be the original red color selected. Intensity number 7 will be a slightly lighter red than number 8. Number 6 will be lighter still and so on until we get to intensity number 1 which will be white or almost white with just a bit of red. Similarly, intensity number 9 will be a slightly darker red than number 8 and number 10 will be darker still until we get to intensity number 15 which is black or very nearly black with a hint of red. The range and step size between each color intensity is a choice made by the artist. A similar process of selecting a range of intensities of colors for each of the principal colors is also carried out. FIG. 4 shows an example of 15 different intensities of the colors red and blue. Although the choices for the chosen color yellow are not shown, a similar range of yellow would be selected.

For each line associated with the principal color (red in this case) that the artist has selected, the artist selects a size and spacing of dots that will be painted along that line. The artist has freedom to decide what the distribution of sizes and spacing of the dots along the line. They could be all of the same size and spacing along a particular line, or the size and spacing could vary along the line as the artist wishes.

The color paint to be used to paint the dot (intensity 1–15 of red) is selected by the grayscale level of the underpainting at the location of the dot. For example, if the underpainting was at its lightest at the location of a specific dot, then red intensity 15 would be used. If another dot was just slightly darker it would be painted with red intensity 14. If another dot was in a location where the underpainting was in the middle of its range of grayscales it would use red intensity 8. If still another dot was in a location where the underpainting was at it darkest then red intensity 1 would be used for that dot.

For each line associated with the principal color red, the artist selects the size (or sizes) of dots and their distribution along that line and then uses the grayscale of the underpainting to select the intensity level of that color to be used for that dot. The artist may also wish to create a particular shape or texture for each dot of paint.

The artist repeats this process for each line associated with each principal color he has selected. Although it is not requirement, the selection of dot sizes and distributions is such that most if not all of the underpainting is covered with colored dots. It is also usual to select the dot sizes so that they are small enough to sample the important features of the underpainting. The finished painting reveals the image of the underpainting and, at the same time, the structure defined by the lines. FIG. 3 shows a completed exemplary Matrix painting, this one from a different underpainting than is shown in FIGS. 1 and 2.

We can now consider other geometric shapes besides lines to be defined over the underpainting. Two dimensional structures of arbitrary shape may also be defined over the underpainting. The artist also associates a principal color to be associated with each defined geometry. In this case the artist selects a two dimensional distribution of dots and dot sizes. The assignment of color intensity based on the gray-level of the underpainting remains the same.

Mr. Seidler has created a market for paintings in this style. Virtually all of the paintings he has produced in the past 11 years have been sold for several thousand dollars each. The difficulty is that the creation of Matrix paintings is extremely labor intensive and physically demanding, and he had all but abandoned this art form.

Matrix Painting Design and Coding

The inventors have appreciated the fact that the tedious and labor intensive aspects of the process of producing a Matrix painting could be automated. Matrix paintings are particularly suited to automation, principally because the image of the painting may be described accurately as a series of dots at specific locations each with a specific color, size, and shape or texture.

The instant application discloses the method of designing and coding a Matrix painting, while related patent application "Mechanism for Applying Paint to Canvas" (filed simultaneously with the instant application Ser. No. 09/838, 549) describes an automated physical mechanism for depositing and redistributing paint on a canvas to make a painting.

The disclosed innovations, in various embodiments, provide one or more of at least the following advantages:
operation is less time consuming;
speed of producing a Matrix painting is greatly reduced;
process is less physically demanding on the artist.

BRIEF DESCRIPTION OF THE DRAWING

The patent or application file contains at least one drawing executed in color. Copies of this patent or patent application publication with color drawing(s) will be provided by the Office upon request and payment of the necessary fee.

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

The present invention is a design tool to aid the artist with the design of Matrix paintings and to collect the design into a data structure that can be used by an automated painting mechanism to produce a Matrix painting.

In the following section we will describe a method for aiding the artist with a matrix painting design and the production of a data structure that describes the painting in sufficient detail that an automated painting mechanism can produce a painting on a canvas. In order to describe succinctly the invention we will use an example in which lines as opposed to other geometric shapes will be defined over the underpainting. This choice and others will be for example and not to suggest limitations.

Figure 1:
FIG. 1 shows an exemplary grayscale under-picture which will become a Matrix painting.
Figure 2:
FIG. 2 shows the picture of FIG. 1 with lines drawn on it.
Figure 3:
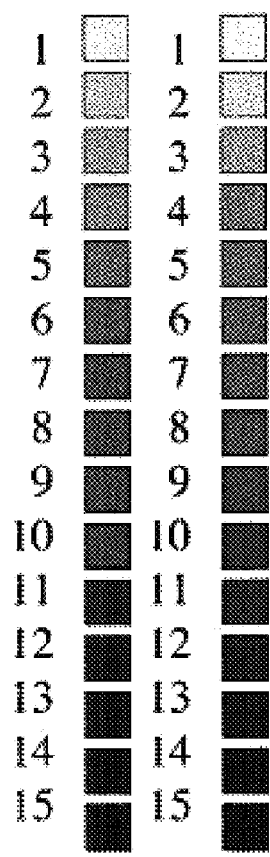
FIG. 3 shows a completed Matrix painting.
Figure 4:
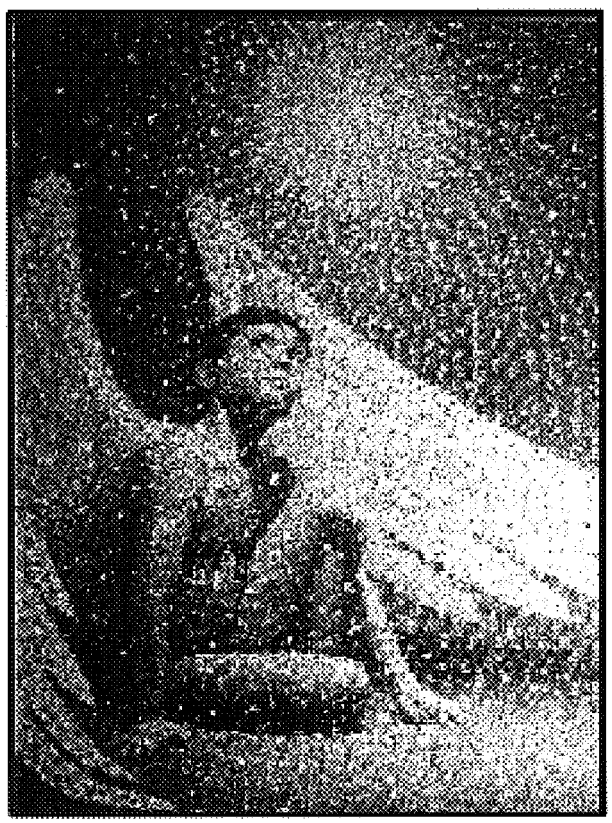
FIG. 4 shows an array of 15 shadings of the colors red and blue.
Figure 5:
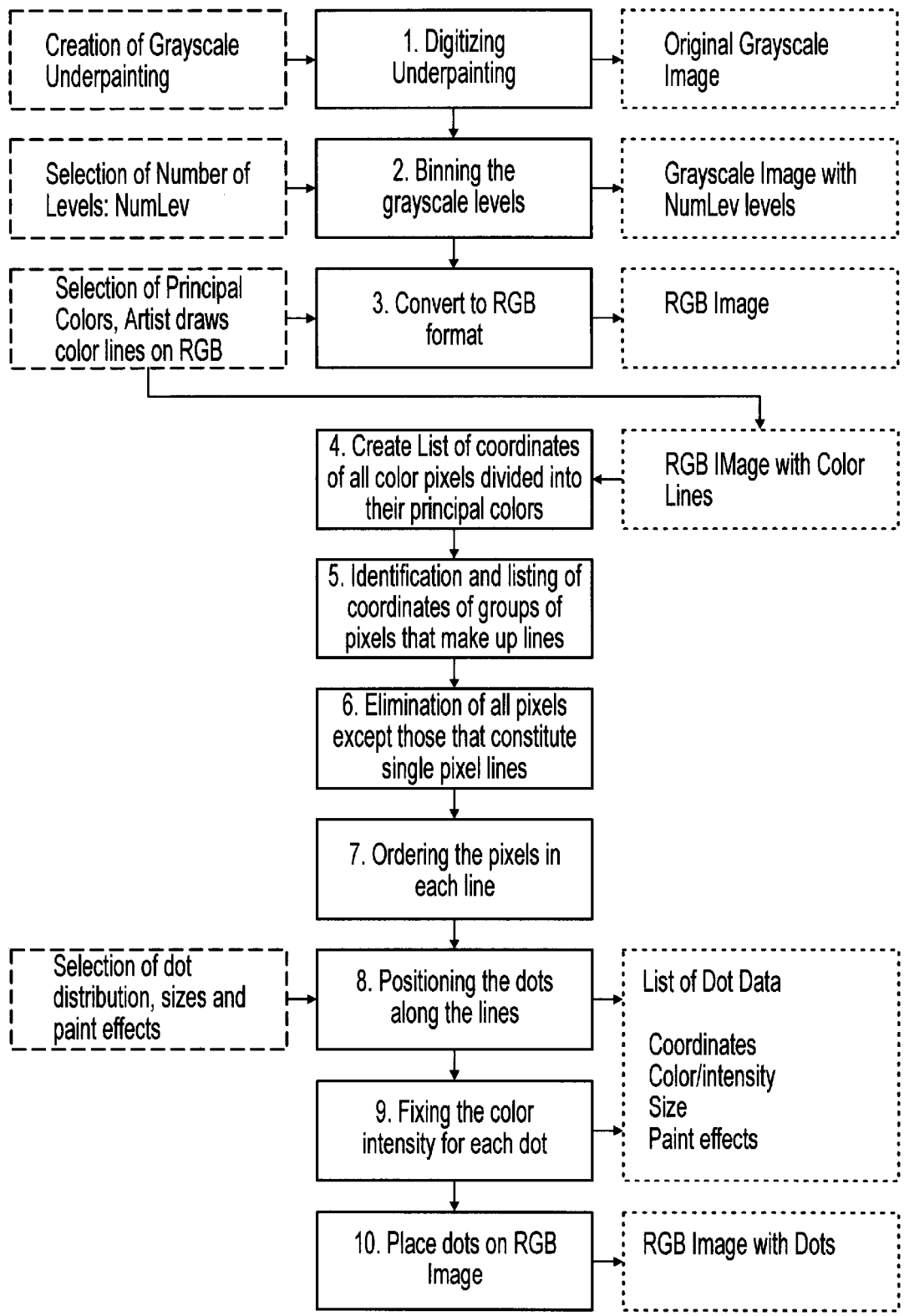
FIG. 5 shows an outline of the process to making a Matrix painting.

The process is described with the help of the flowchart shown in FIG. 5. In this figure, actions which are performed by the artist are shown on the left-hand side, using dashed lines. The process modules, e.g. what the program does, is shown in the center of the flowchart, and the information created and stored by the process is shown on the right-hand side in dotted lines.

Artist Action:

The process begins with the artist creating the underpainting. Although this need not be the case, we assume that the artist will paint the underpainting with conventional manual techniques and that the painting will be grayscale.

Module 1: Digitizing the Underpainting

The image of the grayscale underpainting is digitized. There are several method for digitizing images. Taking a photograph and scanning the photograph with a commercially available image scanner is one approach. Using a digital camera is another option. In either case care needs to be taken to minimize distortions that are typical in camera lenses. With modern photographic equipment and some care by the photographer the distortions may be kept to the inconsequential level for the purposes of this application.

During the digitization process, care must also be taken so that the image has sufficient resolution. In this case sufficient resolution means that the pixel size of the image needs to be at least as small as the smallest dot defined by the artist and preferably smaller than the smallest dot. With modern digital cameras and scanners, resolutions on the order of 1000 by 1000 pixels are readily available and this is sufficient resolution for most Matrix paintings.

This grayscale image may be stored in any one of several graphics formats. For the purposes of this discussion, we will describe the process using the Tagged Image File Format or TIFF. While there are other ways to store images in TIFF files, we will discuss grayscale TIFF files which store each pixel as a single grayscale intensity number from 0–255. We will also discuss Red Green Blue (RGB) TIFF files that store each pixel as three intensity numbers, each in the range of 0–255 and each describing the respective intensity of the red, green, and blue components of the pixel. In the TIFF files these numbers are ordered according to the position of the pixel they represent in terms of its row and column position.

Stored Information:

Graphics file of original gray scale image.

Artist Action:

The artist must choose the number of gray scale levels. This will be the same number of levels as used for the color intensity of the principle colors the artist will later select.

Module 2: Binning the Grayscale Image

After the image of an underpainting is stored as a gray scale TIFF file, the intensity numbers for the pixels in the image are binned into the number of intensity levels that the artist has selected. We are assuming here that each principle color will have the same number of intensities. This restriction is not a requirement, but is the typical choice. We will also assume as in the example above that the artist has chosen 15 intensity levels. There are different methods of binning these intensity numbers. The specific choice for the binning technique may be made by the artist as he or she wishes. The cogent point is that after the binning process, every pixel will have one of 15 (or whatever the number of levels chosen by the artist) values. This is accomplished by forcing the value of the graylevels of pixels into one of 15 values. Usually 15 equal sized ranges of values are selected that covers 0–255 and each pixel falling in that range has its value set to a single value selected from that range. Adobe Photoshop has an effect called "posterize" that bins pixel intensity into a selectable number of intensities.

Stored Information:

Graphics file of grayscale image with discrete number of levels.

Module 3: Convert Grayscale Image to RGB Format

The grayscale image of the underpainting is converted to a RGB format while preserving the information contained in the binned grayscale image. A grayscale TIFF image converted to RGB format will have for each of its pixels, three equal valued intensity numbers the value shared by the 3 numbers will be the same as the intensity value for that pixel in the grayscale version of the TIFF file.

Stored Information:

Graphics file of grayscale image with discrete number of levels stored in a RGB format.

Artist Action:

The next step is for the artist to select a number of principle colors and to draw the lines in those colors that overlay the underpainting. Using a Graphics package such as Adobe PhotoShop, the artist draws color lines on the image of the underpainting. In our example, we are assuming the artist has selected three principle colors. The lines associated with a principle color will be drawn in that color. The artist may draw the three different sets of colored lines on the same image or one set at a time.

Stored Information:

Graphics file of grayscale image with colored lines in RGB format.

Module 4: Identifying Colored Pixels

Once the lines are drawn, a computer program examines the contents of the TIFF file where they were drawn. It identifies all colored pixels as any pixel whose RGB intensities are not equal. Depending on the drawing tool used, some pixels may not be one of the colors intended for that line. This comes about when the tool attempts to produce smooth lines by transitioning the color of pixels at the edge of the line. In these instances, the colored pixels may need to be binned into the set of principle colors. Alternatively the pixels that are not grayscale, but also are not a principle color may be excluded from the list of "colored pixels".

Module 5: Identification of Lines

The pixels that are identified as colored are then grouped into "lines". In this context a line is a group of pixels that are all of a single color that are all contiguous. The process is quite simple. All pixels of a single color have their coordinates listed in a file. A pixel is compared to all other pixels in the file to ascertain which pixels may be one of its eight nearest neighbors. When this comparison is complete, the pixel and any nearest neighbors are removed from the file. Each of the nearest neighbors found are similarly compared one at a time against all remaining pixels and their nearest neighbors are inspected to find nearest neighbors. The process continues until there are no more nearest neighbors to be found. All such pixels removed from the file can be seen to be contiguous and are collected in a list of pixels for that line. If there are pixels left in the file of colored pixels the process of finding lines is continued.

If the lines are drawn as single pixel lines, the process of collecting the pixels into lines is simplified since all of the pixels in a line will have no more than two nearest neighbors except for the two end pixels which will only have a single nearest neighbor.

Module 6: Assuring Single Pixel Lines

If the lines are not drawn as single pixel lines, then pixels in the line are discarded until the line is a single pixel line. There are several techniques that may be used to accomplish this task. One technique that works reasonably well when the assortment of pixels have defined end points is to discard pixels when they have only a single nearest neighbor (other than the two end points) and when they are attached to pixels with more than two nearest neighbors and discarding the pixel will not break the continuity of the line. This pixel elimination scheme applied repetitively will yield a single pixel line.

Module 7: Ordering Pixels in each Line

After all pixels of a particular color have been grouped into a number of lines, and any pixels have been discarded from the list that are not part of single pixel lines, each list of pixels is ordered according to their position in the line from one end of the line to the other. One end of the line or the other may be selected as the start of the line by whatever criteria the artist desires. One possible criteria could be that end closest to the center would be considered the starting point.

The process of grouping, eliminating pixels (if required) and ordering lines is carried out for each primary color selected by the artist. For each color then there will be a number of single pixel lines identified and the coordinates of each pixel in a line will be listed in order from the start to the end of the line.

Artist Action:

The artist then must select the size and spatial distribution of dots to be placed along the lines. There are many possible ways to define the size and distribution of these dots. Although not restricted to circular shapes, we will describe in this application roughly circular dots where the size of a dot can be described as the radius(in pixel spacing units) that includes all of the pixels of that dot. The center pixel of any dot will be a pixel on a line.

The distribution of dots along the line may be defined in several ways. Two possibilities include a set number of pixels from one center to another, or moving along the line a pixel at a time until the absolute distance between two center pixels is greater than or equal to a particular distance.

The artist has a great range of choices in terms of how to define the size and spacing of the dots. For instance, the decision could be made to have all lines of all colors use the same dot size and dot spacing. Or the artist could choose to have all lines of a particular color have a specific size and spacing, while other colors had different dot size and spacing. Or the artist could assign a different dot size and spacing for individual lines. Or the artist could even vary the size and spacing of the dots within one line. A computer program easily provides these and an even wider range of options.

Another aspect of the dot that could be selected by the artist if desired is a brush stroke or other physical method of paint redistribution once it was deposited on the canvas. Again the artist would have a whole host of options in terms of what type of brush strokes and how to assign them to the dots. All dots could receive the same brush stroke or particular brush strokes for particular colors, or particular brush strokes for each line, or even custom brush strokes for each individual dot.

Module 8: Positioning the Dots Along the Lines

If we take the example of one line where the artist has chosen to space the dots by a pixel distance spacing of 15 pixels and has chosen a circular dot size with a 5 pixel radius. The first dot could be placed (centered) at the starting pixel of the line, or an arbitrary number of pixels from the starting pixel. The coordinates of that pixel are stored as the position of the dot, and the radius of the dot is also stored along with the size of the dot. The process of finding the positions of other dots along the line is carried out by moving one pixel at a time along the list of ordered pixels until the difference in the coordinate position from the previous dot to the pixel advanced to is equal or greater than 15 pixel spacing units then that pixel is the center of the next dot and the coordinates and selected size of the dot is stored. The process is continued until the end of the line is encountered. All lines are processed to have dots placed along them with using the choices made by the artist for that line.

Module 9: Determining the Color Intensity for each Dot

Once the coordinates of the dots along the lines of the primary colors have been determined it is possible to assign a color intensity to each dot. This is done by referring to the grayscale level of the original image of the underpainting at the same coordinates as the dot. Since the number of grayscales in the image has been selected to be equal to the number of color intensities, then there is a one to one mapping of grayscale level to color intensity.

It is then possible to collect the information about each dot of paint that will be used to create the matrix painting. The information would be a list that would contain:

Stored Information:

A list or file would contain for each dot:

X Position

Y Position

Color/Intensity

Size

Paint effect (Brush-Stroke)

A device such as described in copending patent application "Mechanism for Applying Paint to Canvas" (inventors Seidler, Randall, and Gray) can use this information to paint or aid in the painting of an oil paint on canvas work of art.

Module 10: Create Preview of Painting

As an aid to the artist, a preview of the painting can be made by modifying the RGB format of the underpainting to include the dots in the placement and size the artist has selected with the appropriate color intensity. By going back to the original image, the drawn lines would not be visible. This preview could be used by the artist to validate the choices made and to modify them, if desired, before paint is applied to the canvas.

An appropriately designed tool will have all of the choices and information stored in a way that allows the artist to go back to any point in the process and modify his or her choices. These modifications may be carried through to the preview to see if the alternate result is more pleasing.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A computer-implemented process to aid in the design of Matrix paintings, comprising the steps of:

digitizing a grayscale underpainting to form a grayscale image;

forcing the grayscale levels of each pixel of said grayscale image to one of a selected levels of intensity to form a secondary grayscale image;

converting said secondary grayscale image to RGB format, using a predetermined selection of principal colors and a plurality of color lines which have been drawn on a copy of said grayscale image, to form an RGB image;

creating a list of coordinates of all color pixels, divided into their principal colors;

identifying and listing coordinates of groups of pixels that make up lines;

elimination of all pixels except those that constitute single pixel lines;

ordering the pixels in each said single pixel line;

determining a plurality of deposition points of paint along said single pixel lines and fixing the color intensity for each of said deposition points of paint, to form a painting data base containing, for each of said deposition points of paint, at least the coordinates and the color, intensity, and amount of paint to be distributed.

2. The computer-implemented process to aid in the design of Matrix paintings of claim 1 further comprising the step of combining said original grayscale image and said painting data base to form an RGB preview image of a finished Matrix painting.

3. The computer-implemented process to aid in the design of Matrix paintings of claim 1, wherein said process can be re-entered at any of the group of steps comprising said forcing step, said converting step, and said determining step, with changes to any of the group of choices comprising said selected levels of intensity, said predetermined selection of principal colors, said plurality of color lines, and said deposition points of paint.

4. The computer-implemented process to aid in the design of Matrix paintings of claim 1, wherein painting data base further comprises instructions for the redistribution of paint after deposition.

* * * * *